July 4, 1939. A. B. HETTRICK 2,165,100

PROCESS FOR PURIFYING PHOSPHORIC ACID

Filed Aug. 28, 1936    2 Sheets—Sheet 2

INVENTOR
Ames B. Hettrick

Patented July 4, 1939

2,165,100

UNITED STATES PATENT OFFICE 2,165,100

PROCESS FOR PURIFYING PHOSPHORIC ACID

Ames B. Hettrick, Piney River, Va., assignor, by mesne assignments, to Virginia Chemical Corporation, a corporation of Delaware Application August 28, 1936, Serial No. 98,310

3 Claims. (Cl. 23—165)

This invention relates to process and apparatus for purifying phosphoric acid, and more particularly to the removal of fluorine compounds from phosphoric acid by diffusing a heated gas through the acid.

In the accompanying drawings which illustrate preferred embodiments of the invention, Figure 1 is a diagrammatic illustration of the whole apparatus;

Figure 4 is a detail vertical section taken on the line IV—IV of Figure 2, illustrating a diffusion unit and a portion of the surrounding lining of the tank; and Figure 5 is a detail vertical section of a modified form of diffusion unit, the view also showing the associated parts.

Figure 1:
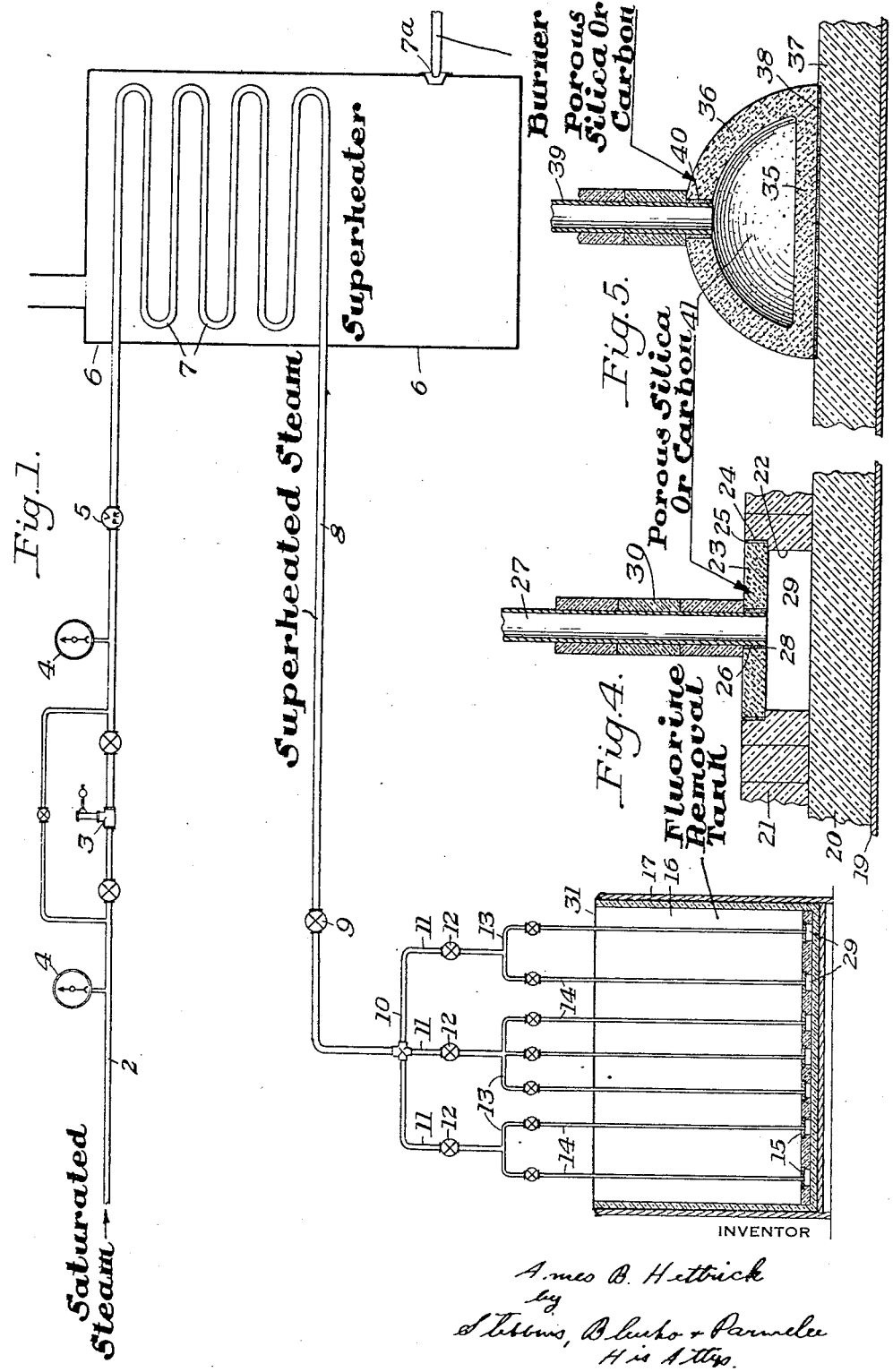
Figure 2:
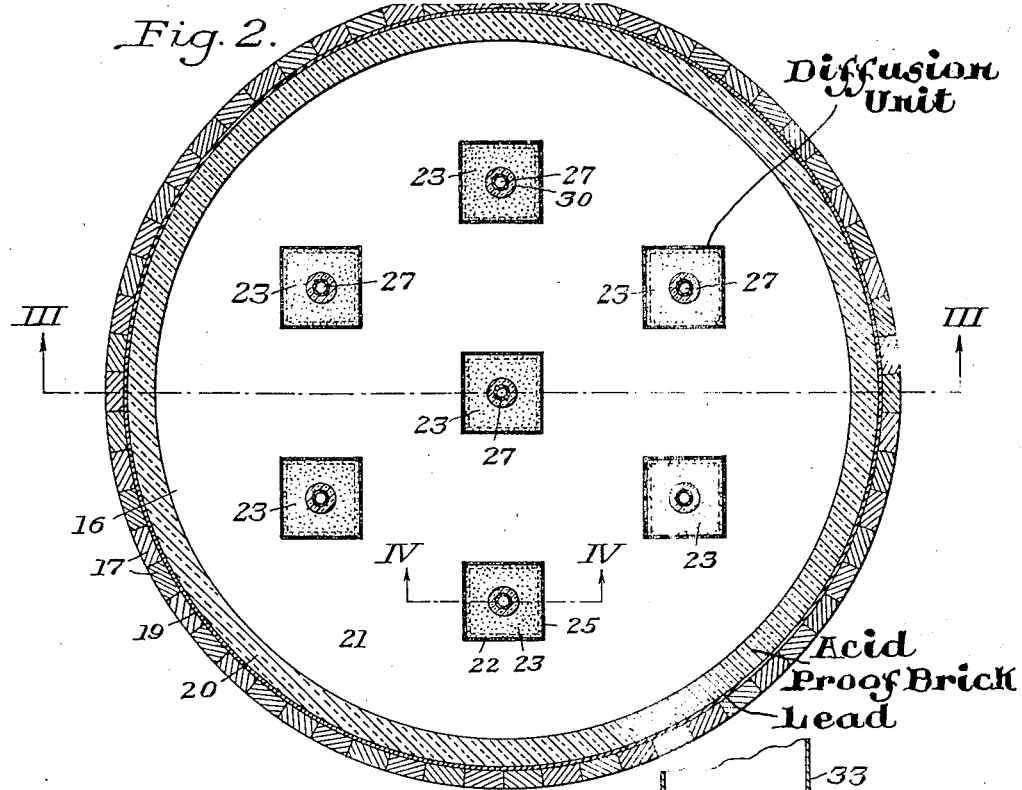
Figure 2 is a horizontal section through the fluorine removal tank taken on the line II—II of Figure 3, showing the diffusion units.
Figure 3:
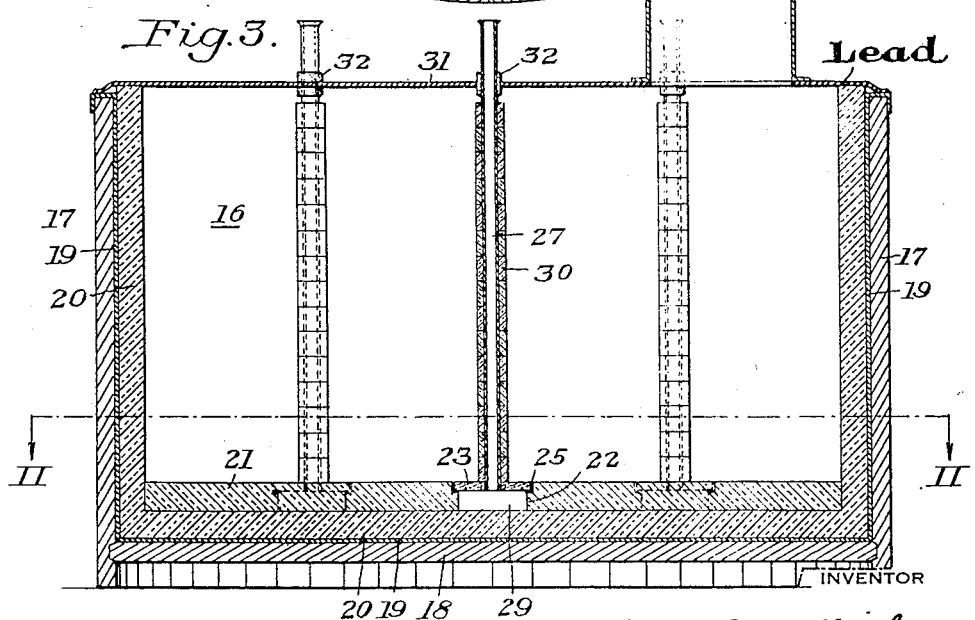
Figure 3 is a vertical section through the fluorine removal tank taken on the line III—III of Figure 2.

Concentrated phosphoric acid as made by any of the well known processes such as the wet sulphuric acid, electro-thermal, or the blast furnace methods contains a considerable amount of fluorine in one or more of its various compounds. These concentrated acids contain fluorine in amounts varying from 800 to 3000 parts per million.

This fluorine content is too high to permit use of this concentrated phosphoric acid in making food grade mono-calcium phosphate without further purification. Boiling this concentrated phosphoric acid at elevated temperatures for long periods in order to eliminate fluorine compounds therefrom has been found to be unsatisfactory when it is attempted on a commercial scale. This difficulty in using this procedure in plant practice has been in obtaining materials of construction which would permit boiling of acid on a large scale. It is not practical to use metallic steam coils or lining for the tank in which the boiling is carried out as the strong phosphoric acid, plus the fluorine compounds being driven off during the boiling process, are exceedingly corrosive. For example, a 3000-gallon batch of acid was boiled for 72 hours at 260° F. in a lead-lined tank with a lead steam coil and approximately 50 pounds of lead was dissolved and taken into solution.

I have invented a process whereby the use of any metal in contact with the acid is eliminated by blowing finely diffused superheated steam or air or other suitable gas through the acid by means of non-metallic diffusion units while held in an acid-proof brick-lined tank.

The process of fluorine removal is most easily carried out by maintaining the acid at about 280° to 290° F. In the preferred process, saturated steam at sufficient pressure to bubble it through the tank of acid is used and this is passed through an individually fired superheater before it enters the tank. Sufficient heat is added to raise the temperature of the steam from saturated temperature at 5 to 8 pounds per square inch gauge to about 700° F. Bubbling this superheated vapor through the concentrated acid serves two purposes:

(1) To transmit the heat required to maintain the required temperature from the heat source to the batch of acid.

(2) To serve as a gaseous medium for volatilizing and removing the fluorine compounds.

For efficient operation it is necessary that the steam be diffused through the acid as thoroughly as possible, preferably as minute bubbles. This may be accomplished by using diffusion disks of carbon or silica. These materials are used in preference to metallic diffusion devices because the temperature prevailing, together with the presence of fluorine and phosphoric acid, have proven to be very corrosive towards all metals, even those ordinarily considered to be highly corrosion-resistant.

The unique advantage in the use of superheated steam is that most of the steam is used as a gaseous medium and only a small portion is condensed. This condensation takes place during the period that the acid is being heated up to its boiling point. The latent heat liberated by this condensing steam assists in raising and maintaining the temperature and the condensed water prevents further concentration of the strong acid. Thus there is a continuous cycle of evaporation and condensation. The heat applied to the saturated steam during the superheating process is transmitted to the acid in the tank and serves to raise and maintain the temperature at the desired point, but at the same time the condensation in the tank during the heating up period is sufficient to maintain the concentration preferably at about 70 to 72% during the entire boiling cycle of 48 to 72 hours. This is highly desirable as there is no possibility of increasing the concentration and consequently little possibility of increasing the temperature to the point where there is danger of converting the ortho-phosphoric acid to the pyro-phosphoric acid form. Air may be used as the heat transfer medium, but superheated steam is preferred because of its higher specific heat.

The chief virtue of this process is that it can be used to remove fluorine without contaminating the acid with any metallic impurities which would have to be removed subsequently. For example, the acid before treatment for removal of fluorine contains approximately 1 part per million of lead, and is in all respects suitable for use in manufacturing food products without further processing for the removal of lead or other metallic impurities. However, if lead coils are used for boiling the acid for fluorine removal, the lead content of the acid will increase to several thousand parts per million. This is true, to a more or less degree, with all the common available materials of construction including the acid resisting alloys. With my process, which is carried out in an acid-proof brick-lined tank with the superheated steam or air injected through carbon or silica tubes and porous diffusion disks, I am able to produce a concentrated acid of low fluorine content without increasing the metallic contamination and no further processing is required for removal of metallic contamination.

This process may be carried out either with or without having silicon compounds present. In this process silicon compounds may be present in the acid fed to the process and additional silicon compounds are dissolved in the acid through the slight reaction of the hot acid with the acid-proof brick lining.

My process has been used for purifying several thousand gallons of acid and the fluorine content of the acid has been reduced in all cases from 1000 to 1200 parts per million to below 50 parts per million in periods of 48 to 72 hours.

Referring more particularly to the accompanying drawings, and for the present to Figure 1, saturated steam from any suitable source is conducted through a pipe 2 provided with a reducing pressure valve 3, gauges 4 and a safety valve 5 to a superheater 6. In the superheater, the steam passes through a coil 7 and is heated by a burner 7a to a temperature of about 400° to 700° F., preferably about 700° F. The superheated steam is conducted through a pipe 8 provided with a valve 9 to a header 10 which distributes the superheated steam through pipes 11 provided with valves 12 to branch headers 13 which are connected to tubes 14 connected to diffusion units 15 located in the fluorine removal tank 16.

Referring now to the other figures, the side of the fluorine removal tank is made of wood staves 17 and the bottom 18 is also of wood. Inside of this is placed a lead lining 19. Inside of the lead lining is placed a lining 20 of acid-proof brick which covers the side and bottom of the tank. An inner lining 21 of acid-proof brick is placed in the bottom of the tank on the lining 20. The lining 21 of acid-proof brick is provided with openings 22, in the embodiment shown, seven such openings being provided, each for the reception of a filtering disk or unit 23. The bricks forming that portion of the lining 21 adjacent the openings 22 are recessed as indicated by the reference numeral 24 so as to receive the diffusion units. The diffusion units are cemented to the lining 21 with acid-proof cement 25. Each diffusion unit has an opening 26 extending through it, into which extends a tube 27 which is cemented to the diffusion unit by acid-proof cement indicated by the reference numeral 28. There is a space 29 provided between the diffusion unit 23 and the lining 20, so that superheated steam or air conducted to the chamber through the tube 27 will have an opportunity to diffuse through the diffusion disk 23 into the acid. The diffusion unit 23 and tube 27 are made of a non-metallic acid-proof material such as silica or carbon. The diffusion disks are porous, but the tubes 27 are impervious. The tubes are further protected from attack by the acid by acid-proof bricks or beads 30. The tubes extend upwardly through the tank which is provided with a lead cover 31, the upper ends of the tubes being connected to the superheated steam or air supply headers. Asbestos packing 32 is placed between the tubes 27 and the holes in the cover through which the tubes extend in order to prevent possible breakage of the tubes and to seal the openings. Such packing is particularly desirable if instead of making the tubes of silica or carbon, they are made of heat resisting glass. The fumes driven off from the acid are carried away through a stack 33.

In Figure 5, a different form of porous diffusion unit is shown. Instead of being in the form of a flat disk or plate, such as shown in the other figures, it is of hemispherical shape. It comprises a flat base 35 and a hemispherical top 36. The base is cemented to the bottom lining 37 of the tank by acid-proof cement 38. Superheated steam or air is supplied to the diffusion unit through an impervious carbon pipe 39 also cemented to the unit as indicated by the reference numeral 40. In this embodiment, the diffusion unit itself forms a chamber 41 for the superheated steam or air which is diffused through the acid in the removal of fluorine and its compounds.

The term "fluorine" as used in the specification and claims, is intended to cover not only fluorine per se, but also its compounds.

I have illustrated and described two embodiments of the apparatus and the preferred procedure in carrying out the process. It is to be understood, however, that the invention may be otherwise embodied or practiced within the scope of the following claims.

I claim:

1. A process of reducing the fluorine content of concentrated phosphoric acid which comprises blowing superheated steam up through the boiling acid, kept at a temperature of approximately 280° F. for a period of time sufficient to reduce the fluorine content to less than 50 parts per million, while preventing the evaporation of water beyond the original concentration of the acid.

2. A process of reducing the fluorine content of concentrated phosphoric acid, which comprises diffusing superheated steam through the boiling acid kept at a temperature above the boiling point of the acid for 48 to 72 hours while preventing evaporation of water substantially beyond the original concentration of the acid.

3. A process of reducing the fluorine content of concentrated phosphoric acid, which comprises diffusing superheated steam through the boiling acid kept at a temperature above the boiling point of the acid for a period of time sufficient to reduce the fluorine content to less than 50 parts per million while preventing evaporation of water substantially beyond the original concentration of the acid.

AMES B. HETTRICK.